United States Patent
Fuller et al.

[11] Patent Number: 6,144,129
[45] Date of Patent: Nov. 7, 2000

[54] SPRING MOUNTING FOR AN ELECTRIC GENERATOR

[75] Inventors: Robert Allen Fuller, Orlando; John Barry Sargeant, Oviedo, both of Fla.; Derek Wayne Green, Charlotte, N.C.

[73] Assignee: Siemens Westinghouse Power Corporation, Orlando, Fla.

[21] Appl. No.: 09/298,260

[22] Filed: Apr. 22, 1999

Related U.S. Application Data

[63] Continuation-in-part of application No. 09/274,260, Mar. 22, 1999.

[51] Int. Cl.[7] .................................................. H02K 5/00
[52] U.S. Cl. ....................... 310/91; 310/254; 310/258; 310/89; 310/259; 171/252
[58] Field of Search ............... 310/91, 254, 258, 310/89, 259; 171/252

[56] References Cited

U.S. PATENT DOCUMENTS

| | | |
|---|---|---|
| 2,320,843 | 6/1943 | Baudry . |
| 2,561,994 | 7/1951 | Rashevsky et al. . |
| 2,811,659 | 10/1957 | Barlow et al. . |
| 2,846,603 | 8/1958 | Webster et al. . |
| 3,740,599 | 6/1973 | Dochterman . |
| 3,791,682 | 2/1974 | Mitchell . |
| 4,012,654 | 3/1977 | Starcevic . |
| 4,051,399 | 9/1977 | Stanwick et al. ........................ 310/51 |
| 4,145,626 | 3/1979 | Aroshidze et al. . |
| 4,174,482 | 11/1979 | Bollman . |
| 4,217,510 | 8/1980 | Detinko et al. . |
| 4,230,960 | 10/1980 | Mayher et al. . |
| 4,249,097 | 2/1981 | Gronholm . |
| 4,284,920 | 8/1981 | Nelson . |
| 4,330,726 | 5/1982 | Albright et al. ........................ 310/254 |
| 4,341,968 | 7/1982 | Borden et al. . |
| 4,387,317 | 6/1983 | Alkire et al. . |
| 4,425,523 | 1/1984 | Detinko et al. ........................ 310/258 |
| 4,450,373 | 5/1984 | Miller et al. . |
| 4,536,671 | 8/1985 | Miller . |
| 4,572,980 | 2/1986 | Anderson et al. . |
| 4,584,497 | 4/1986 | Butman, Jr. et al. . |
| 4,587,722 | 5/1986 | Miller . |
| 4,593,223 | 6/1986 | Lehoczky . |
| 4,656,382 | 4/1987 | Moore et al. . |
| 4,694,190 | 9/1987 | Lane et al. . |
| 4,891,540 | 1/1990 | Cooper et al. ........................ 310/254 |
| 4,942,326 | 7/1990 | Butler, III et al. . |
| 5,117,140 | 5/1992 | Sargeant et al. ........................ 310/91 |
| 5,373,211 | 12/1994 | Ramirez-Coronel et al. . |

*Primary Examiner*—Nick Ponomarenko
*Assistant Examiner*—Thanh Lam

[57] ABSTRACT

A support system for an electric generator having a tapered spring bar connected between the stator core and stator frame, where the spring bar has a continuously tapered cross-sectional area along its length. The tapered cross-section provides a larger cross-sectional area at points having high bending moment and a smaller cross-sectional area at points having low bending moment. By eliminating material in areas of low bending force, a robust support system having increased flexibility is provided. The spring bar may further be formed from a plurality of thinner laminations, thereby providing the support system designer with an additional degree of flexibility for independently controlling the natural frequency of the supports in the radial and tangential directions.

24 Claims, 2 Drawing Sheets

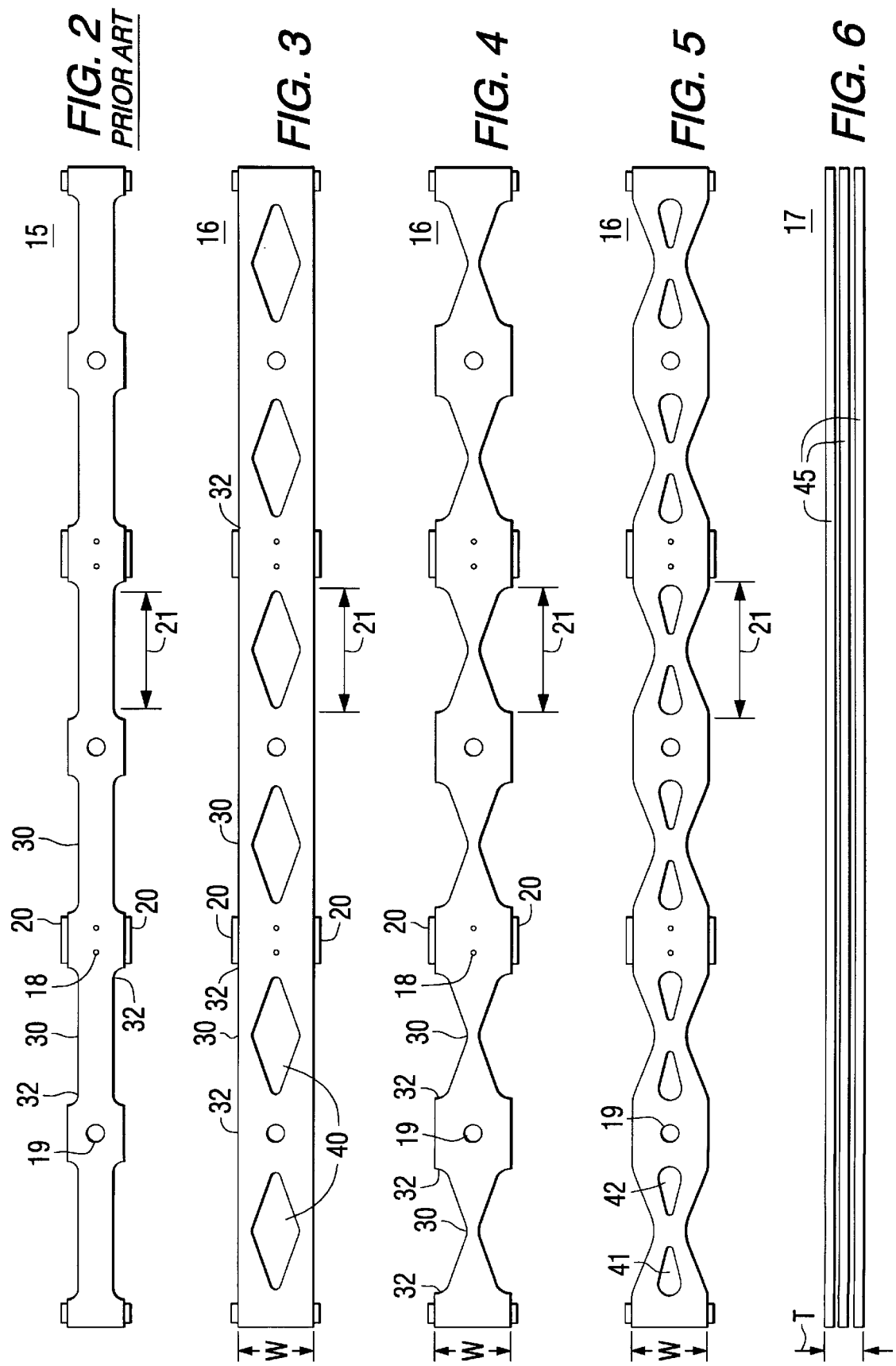

SPRING MOUNTING FOR AN ELECTRIC GENERATOR

This application is a continuation-in-part of Ser. No. 09/274,260 filed on Mar. 22, 1999.

BACKGROUND OF THE INVENTION

The present invention relates to electric generators, and more specifically, to a spring mounting system supporting a stator core within a stator frame of such generators.

As the rotor of an electric generator rotates, its magnetic field revolves in unison with the rotor. This rotating magnetic field exerts a cyclical force on the generator's stator core. This force, in turn, causes vibrations to occur in the core which are of concern in high speed, high power machines. The stator core of a machine having a two-pole rotor experiences an elliptical deformation that follows the rotation of the rotor during operation, with resulting vibrations that are at a frequency twice that of the rotational speed of the rotor. The cyclical vibrations will be transmitted through the frame to the generator foundation. The magnitude will depend upon the degree of isolation incorporated in the design of the support system.

It is known in the art to utilize spring bars to resiliently support a stator core within a stator core frame. For example, U.S. Pat. No. 2,811,659, issued to Barlow, et al. on Oct. 29, 1957, incorporated by reference herein, discloses a stator core mounted in a stator frame by means of resilient support bars (spring bars) extending axially between ribs of a stator frame and the stator core. Barlow teaches that minimum contact between the spring bars and the stator core minimizes transmission of vibration.

Although the prior art has proven to be satisfactory, occasionally high elliptical mode stator frame vibration at two times rotational frequency is experienced. The amplitude of vibration will be determined by the proximity of the elliptical natural frequency of the stator frame to two times rotational frequency and to the magnitude of radial excitation exerted by the dilating stator core through the connecting spring bars.

An electric generator may be subjected to short circuit or other abnormal fault conditions during operation. High instantaneous torque loads can result depending upon the proximity of the torsional natural frequency of the spring mounted stator core to operating frequency. This large torque amplification is imposed upon the spring bars and the connections to the stator frame through to the foundation and can mandate robust support structure and foundation bolting requirements. The torque load amplification during short circuit conditions is a function of the air gap torque, the system torsional natural frequency, and the rotor rotating frequency. The air gap torque and the rotor frequency are functions of the generator design. However, by controlling the system natural frequency, the off-normal torque loading imposed on the generator support system can be minimized. From the literature it is known that vibration isolation can be achieved when the ratio of forcing frequency to natural frequency is $\sqrt{2}$ or preferably greater if significant reduction in response is desired. Therefore, it is desirable to "low tune" the torsional natural frequency of the support system. Although the prior art is based upon this recognition, the reduction in torsional natural frequency of the spring mounted stator core is limited by the resulting high stress and consequent material strength requirements as the spring bars of the prior art are slenderized.

The object of the present invention, therefore, is to provide a support structure that is capable of reducing the torque amplification under short circuit conditions, slenderizing and reducing the stresses in the spring bars during short circuit conditions, and reducing the magnitude of radial excitation force transmitted by the spring bars during normal operation.

SUMMARY OF THE INVENTION

These and other objects of the present invention are achieved in a support structure for mounting an electric generator stator core within a stator core frame, the support structure having a spring bar attached to the stator core at a first location and attached to the stator core frame at a second location and having an active length portion therebetween; the spring bar further having a cross-section area that changes along the active length portion.

BRIEF DESCRIPTION OF THE DRAWING

For a better understanding of the present invention, the following detailed description should be considered in conjunction with the accompanying drawings in which:

FIG. 2 is a top view of a prior art spring bar.

FIG. 3 is a top view of a first embodiment of a spring bar in accordance with the present invention.

FIG. 4 is a top view of a second embodiment of a spring bar in accordance with the present invention.

FIG. 5 is a top view of a third embodiment of a spring bar in accordance with the present invention.

FIG. 6 is a side view of a laminated spring bar in accordance with the present invention.

The same reference numbers are used to refer to the similar parts throughout the various figures.

DETAILED DESCRIPTION OF THE INVENTION

Figure 1:
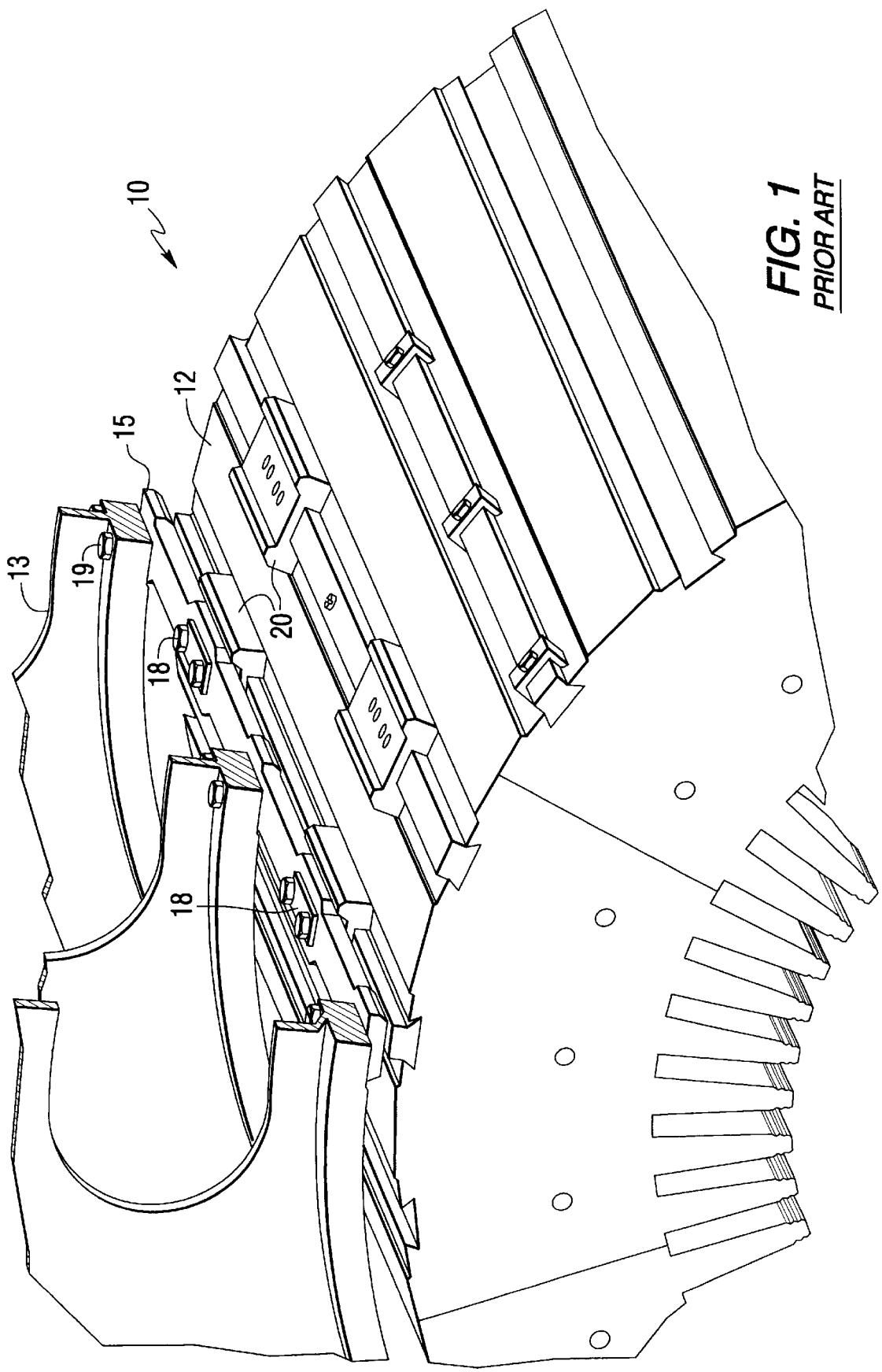
FIG. 1 is a cutaway perspective view of a prior art electric generator illustrating a spring bar mounted between a stator core and stator core frame.

FIG. 1 is a partial cutaway perspective view of a prior art electric generator illustrating a spring bar mounted between a stator core and stator core frame. In the embodiment of FIG. 1 a spring bar 15 extends the longitudinal length of the stator core 12. At a plurality of locations, the spring bar 15 is attached to the stator core 12 by mechanical connections 18. The mechanical connections 18 include brackets 20, sometimes referred to as key blocks, fixed on the stator core 12. A second set of mechanical connections 19 is used to connect the spring bar 15 to the stator core frame 13. An alternative approach of connecting spring bars 15 between the stator core 12 and stator core frame 13 is taught in U.S. Pat. No. 4,425,523, issued to Detinko et al. on Jan. 10, 1984, which is incorporated by reference herein.

FIG. 2 through FIG. 5 are top views of four spring bars where FIG. 2 illustrates a prior art spring bar and FIGS. 3 through 5 are embodiments of tapered spring bars in accordance with the present invention. The most simple design (not shown) for a spring bar would be to have a constant width along its entire length. However, if the width required at the connections 18,19 is utilized along the entire length of the spring bar, the resulting tangential stiffness of the spring bar will generally be too high.

Prior art spring bars 15 are typically single piece dogbone shaped structures having a uniform thickness of approximately 1.25 inches. FIG. 2 illustrates a prior art configuration where the spring bar 15 has a first greater width at the connections 18, 19 and a second smaller width over the remainder of the length of the spring bar 15. This remainder length portion of the spring bar 15 exclusive of the area immediately proximate to the connection locations 18,19 may be referred to as the active length portion 21 of the spring bar 15.

Spring bar 15 carries both shear loads and bending moment loads. The shear loads are constant over the active length portion 21 between connection locations 18,19, however, the bending moments vary from a maximum value at the connection points 18,19 to zero at a midpoint 30 between the connections 18,19. Since the cross-sectional area and shape of the spring bar 15 of FIG. 2 is constant over the active length portion 21, the total stress is at a maximum at the point 32 proximate the connections 18,19. An increase in the cross-sectional area of the section between the connections 18,19 will reduce the value of maximum stress, but will also increase the stiffness of the spring bar 15, thereby serving to increase the loads transmitted to the foundation.

FIG. 3 illustrates an embodiment of the present invention where a spring bar 16 has a tapered or varying cross-sectional area and shape along its active length 21 between the connections 18,19. The spring bar 16 in FIG. 3 has a generally rectangular outer cross-section. The outer width W at connections 18,19 is generally dictated by the size and shape of the brackets 20 used to secure the spring bar 16 to the stator core 12. The outer width W of the spring bar 16 is constant along the entire length of the spring bar 16, as is its thickness T (not shown) in a direction into the plane of the paper. The cross-sectional area and shape, however, is tapered along its active length 21 by diamond shaped void segments 40 formed in the spring bar 16. The generally diamond shaped void segments 40 are preferably evenly spaced between two adjacent connections 18, 19 and are thereby centered in the active length 21. The nominal dimensions of one embodiment of a spring bar 16 for an electrical generator for a commercial power plant are as follows: the distance on centers between the connections 18,19 being 28.25 inches; the longitudinal length of the void segment 40 measured at its maximum value along the center of the spring bar being 14.0 inches; the maximum width of the void segment 40 in a direction perpendicular to its longitudinal length at the mid-point between connections 18,19 being 4.54 inches; the width W being 0.725 inches; and the thickness being 0.77 inches along its entire longitudinal length. For a longer generator, the distance on centers between the connections 18,19 may be increased without changing the other dimensions, however, the peak stress in the spring bar 16 will be increased accordingly. If the distance on centers must be increased beyond a length providing acceptable stress levels, an additional connection 18,19 can be added, thereby reducing the distance on centers and lowering the peak stress value. The cross-sectional area of spring bar 16 is therefore greatest at the connections 18,19 and at points 32 at the ends of the active length portions 21 immediately proximate to connections 18,19. Advantageously, these locations 32 are also the locations where the spring bar 16 experiences its maximum bending moment. Between two points 32 of maximum stress the spring bar 16 progressively tapers or narrows in cross-sectional area until a point 30 that is the mid-point of the active length portion 21 and is midway between the connection points. At the mid-point 30 between the connections 18,19 the cross-sectional area of the tapered spring bar 16 is at its smallest value and the bending moment is zero. This reduction in cross-sectional area provides increased flexibility to the spring bar16, most importantly in the tangential direction. Advantageously the design of FIG. 3 provides for the point of maximum bending force 32 to be located remote from the point of smallest cross-sectional area 30, thereby reducing the peak stress in the spring bar 16. The force transmitted at mid-point 30 is shear force only; as there is no bending moment at this position mid-way between support points 18,19. A spring bar 16 in accordance with this invention may be fabricated from materials known in the art, for example spring steel or composite materials.

FIG. 4 illustrates an alternate embodiment of the present invention where the outer width W of the spring bar 16 is tapered along its length. The outer width is widest at the connections 18,19 and at points 32 immediately proximate the connections 18,19 at the end of active length portion 21. The thickness at these locations is generally dictated by the size and shape of the brackets 20 used to secure the spring bar 16 to the stator core 12. Here again, as illustrated in FIG. 3, the points 32 of maximum bending moment correspond to points 32 of maximum cross-sectional area. The width W tapers to a minimum at a point 30 mid-point of the active length portion 21, thereby providing a reduced cross-sectional area at the point 30 of zero bending moment. This reduction in cross-section area is achieved without increasing the maximum stress value in the spring bar 16, and it provides the advantage of a reduced stiffness most importantly in the torsional direction.

FIG. 5 illustrates an third embodiment of the present invention where the outer width W of the spring bar 16 is tapered between the connection points 18,19 but not to the same degree as the embodiment in FIG. 4. Two mirror image, generally triangular shaped, oppositely-facing void segments 41,42 are formed to further achieve the desired tapered cross-section in the active length portion 21 accordance with this invention.

The use of a spring bar 16 having a continuously tapering cross-section along its active length portion 21 between the connections 18,19 permits the desired low values of torsional natural frequency to be attained while still maintaining the required strength for carrying dead weight and operational loads. The tapered cross-section of the spring bar 16 as disclosed in the present invention may be visualized as a string of connected cantilevers. It will be appreciated by those skilled in the art that a tapered section cantilever will provide greater flexibility for a given material strength than would a uniform cross-section. The cross-section of a spring bar 16 in accordance with this invention may be tapered continuously along its active length 21 or it may have sections of constant cross-section combined with sections of tapered or varying cross-sectional area along its active length 21.

FIG. 6 is a side view of a laminated spring bar 17 in accordance with the present invention. In the embodiment of FIG. 6 the thickness T of spring bar 17 is established by a laminated group of thinner members 45. All members 45 have the same width, and the spring bar 17 may be formed in any shape, for example those illustrated in FIGS. 2–5. A spring bar 17 formed by laminations of thinner members 45 will provide increased radial flexibility when compared to a spring bar 15,16 formed in the same shape from a single thickness of material. However, the use of such laminated material will not materially affect the flexibility in the torsional direction. The use of a spring bar 17 formed from a number of thinner members 45 provides the support system designer with an additional degree of flexibility for independently varying the spring characteristics of the spring bar 17 in the radial and tangential directions. For a given stiffness in the torsional direction as necessary to support dead weight and operational torque loads, a spring bar 17 formed from a plurality of thinner members 45 will provide a higher degree of flexibility in the radial direction than a single piece spring bar 15 16. This increased radial flexibility will reduce the radial excitation force transmitted from the dilating stator core through the spring bars to the stator frame. The amplitude of stator frame vibration, as a result of the reduction in excitation force, will be proportionately reduced. The greater flexure flexibility of the laminated spring bar 17 also permits larger amounts of pre-flexure during the assembly of the stator core 12 to the stator core frame 13, thereby permitting greater tolerance on true position requirements. In one embodiment the spring bar 17 is formed of two spring steel laminates each being 0.375 inches thick and separated by shims having a thickness of 0.02 inches, so that the overall thickness of the laminated spring bar is 0.770 inches. The laminates may be formed from low alloy carbon steel such as conforming to specification ASTM A-572. The two laminates may be joined together by a weld joint at the connection locations 18,19 with one or more plug welds to ensure the proper transfer of loads between the laminates and to facilitate handling and assembly of the component.

While the invention has been described in what is presently considered to be a preferred embodiment, many variations and modifications will become apparent to those skilled in the art. Accordingly, the invention should not be limited to the specific illustrative embodiment, but be interpreted within the full spirit and scope of the appended claims.

What is claimed is:

1. A support structure for mounting an electric generator stator core within a stator core frame the support structure comprising:
    a spring bar attached to said stator core at a first location and attached to said stator core frame at a second location and having an active length portion therebetween;
    said spring bar further comprising a cross-section area that changes along said active length portion;
    wherein said spring bar comprises a generally rectangular cross-section having a width that tapers continuously along said active length portion.

2. The support structure of claim 1, wherein a point of smallest cross-sectional area along said active length portion is located remote from a point of highest bending force in said active length portion during the operation of said generator.

3. The support structure of claim 1, wherein said spring bar further comprises a plurality of layers of material.

4. The support structure of claim 1, wherein said spring bar comprises a minimum cross-sectional area at a mid-point between said first and said second locations.

5. The support structure of claim 1, wherein said spring bar comprises a uniform width and thickness along its length and further comprises a void segment formed in said spring bar between said first and said second locations.

6. The support structure of claim 5, wherein said void segment comprises a generally diamond shape.

7. The support structure of claim 6, wherein a longitudinal distance on centers between said first and second locations is 28.25 inches, a longitudinal length of said void segment is 14.0 inches, a width of said spring bar is 0.725 inches, a width of said void segment is 4.54 inches, and a thickness of said spring bar is 0.77 inches.

8. The support structure of claim 1, wherein said spring bar comprises two mirror image oppositely-facing generally triangular shaped void segments formed in said spring bar between said first and said second locations.

9. The support structure of claim 1, wherein said spring bar comprises a point of minimum cross-sectional area at a point along its length subjected to zero bending moment due to torsional loading during operation of said generator.

10. A support structure for mounting an electric generator stator core to a frame, the support structure comprising:
    a spring bar connected to said stator core at a first location and connected to said frame at a second location;
    said spring bar comprising a plurality of layers of material.

11. The support structure of claim 10, said spring bar further comprising a cross-section tapered along an active length of said spring bar between said first and said second locations.

12. The support structure of claim 10, wherein a point of smallest cross-sectional area along a length of said spring bar is located remote from a point of highest torsional bending moment during the operation of said generator.

13. The support structure of claim 10, wherein said spring bar comprises a minimum cross-sectional area at a mid-point between said first and said second locations.

14. The support structure of claim 10, wherein said spring bar comprises a uniform width and thickness along its length and further comprises a void segment formed in said spring bar between said first and said second locations.

15. The support structure of claim 14, wherein said void segment comprises a generally diamond shape.

16. The support structure of claim 10, wherein said spring bar comprises two mirror image oppositely-facing generally triangular shaped void segments formed in said spring bar between said first and said second locations.

17. The support structure of claim 10, wherein said spring bar comprises a point of minimum cross-sectional area at a point along its length subjected to zero bending moment due to torsional loading during operation of said generator.

18. The support structure of claim 10 wherein said spring bar comprises two laminate layers.

19. The support structure of claim 10, further comprising a weld joining the layers of material at each of the first and second locations.

20. A support structure for mounting an electric generator stator core within a stator core frame, the support structure comprising:
    a spring bar attached to said stator core at a first location and attached to said stator core frame at a second location and having an active length portion therebetween;
    said spring bar further comprising a cross-section area that changes along said active length portion;
    wherein a point of smallest cross-sectional area along said active length portion is located remote from a point of highest bending force in said active length portion during the operation of said generator.

21. The support structure of claim 20, wherein said spring bar comprises a generally rectangular cross-section having a width that tapers continuously along said active length portion.

22. The support structure of claim 20, wherein said spring bar further comprises a plurality of layers of material.

23. The support structure of claim 20, wherein said spring bar comprises a minimum cross-sectional area at a mid-point between said first and said second locations.

24. The support structure of claim 20, wherein said spring bar comprises a uniform width and thickness along its length and further comprises a void segment formed in said spring bar between said first and said second locations.

* * * * *